United States Patent
Nakagawa

(10) Patent No.: US 6,563,791 B1
(45) Date of Patent: May 13, 2003

(54) TRAFFIC SHAPING METHOD AND APPARATUS

(75) Inventor: Tatsuo Nakagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/164,596

(22) Filed: Oct. 1, 1998

(30) Foreign Application Priority Data

Oct. 2, 1997 (JP) .............................................. 9-269999

(51) Int. Cl.$^7$ .............................................. G01R 31/08
(52) U.S. Cl. ...................... 370/235; 370/395.6; 370/466
(58) Field of Search ................................. 370/229, 230, 370/231, 232, 233, 234, 235, 395.1, 395.6, 395.64, 465, 466

(56) References Cited

U.S. PATENT DOCUMENTS

| | | | |
|---|---|---|---|
| 5,381,407 A | * 1/1995 | Cho | 370/233 |
| 5,524,006 A | * 6/1996 | Hluchyj et al. | 370/233 |
| 5,675,384 A | * 10/1997 | Ramamurthy et al. | 375/240.04 |
| 5,694,554 A | * 12/1997 | Kawabata et al. | 370/412 |
| 5,703,870 A | * 12/1997 | Murase | 370/232 |
| 5,796,719 A | * 8/1998 | Peris et al. | 370/231 |
| 5,926,459 A | * 7/1999 | Lyles et al. | 370/230 |

FOREIGN PATENT DOCUMENTS

| | | |
|---|---|---|
| JP | 7-74758 | 3/1995 |
| JP | 7-283817 | 10/1995 |
| JP | 7-297831 | 11/1995 |
| JP | 7-297840 | 11/1995 |
| JP | 8-172438 | 7/1996 |
| JP | 8-223173 | 8/1996 |

* cited by examiner

*Primary Examiner*—David Vincent
*Assistant Examiner*—Bob A. Phunkulh
(74) *Attorney, Agent, or Firm*—Foley & Lardner

(57) ABSTRACT

A traffic shaping method and apparatus which prevents a violation to a peak rate caused by a fluctuation of a flow of ATM cells outputted from a frame crossing over circuit is provided. A traffic shaping apparatus which includes a traffic shaper for shaping input ATM cells and a frame crossing over circuit for crossing over the frame period of output ATM cells outputted from the traffic shaper is provided with an output rate supervision circuit which supervises the transmission rate of output ATM cells and transmits, if it detects an overhead inserted in the output ATM cells, a back pressure to the traffic shaper to stop the traffic shaping operation of the traffic shaper. However, if the transmission average rate exhibits a drop, then the output rate supervision circuit transmits output rate information to the traffic shaper so that the traffic shaper may perform its traffic shaping operation until the transmission average rate rises to an allowable maximum rate set in advance.

6 Claims, 3 Drawing Sheets

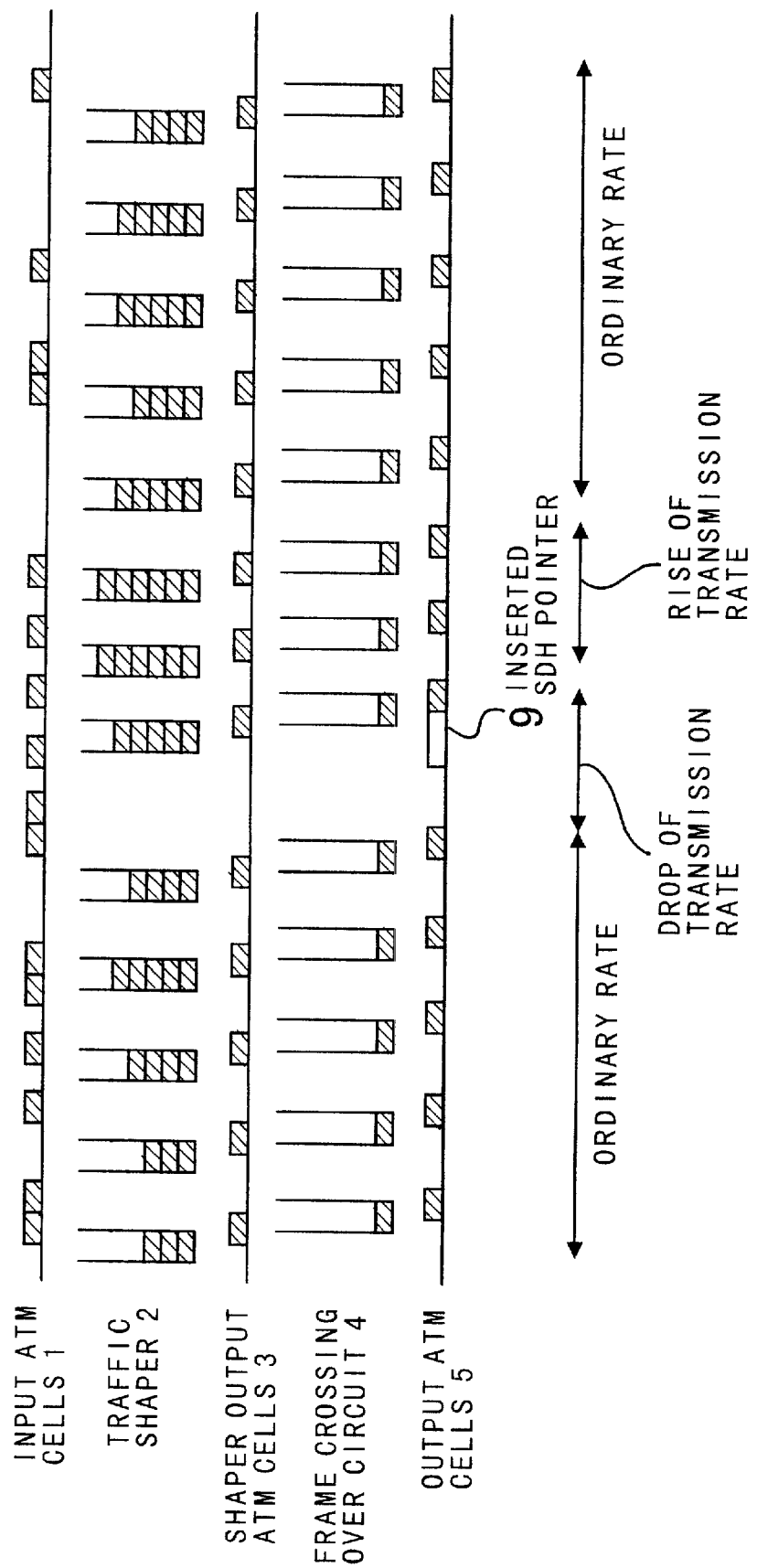

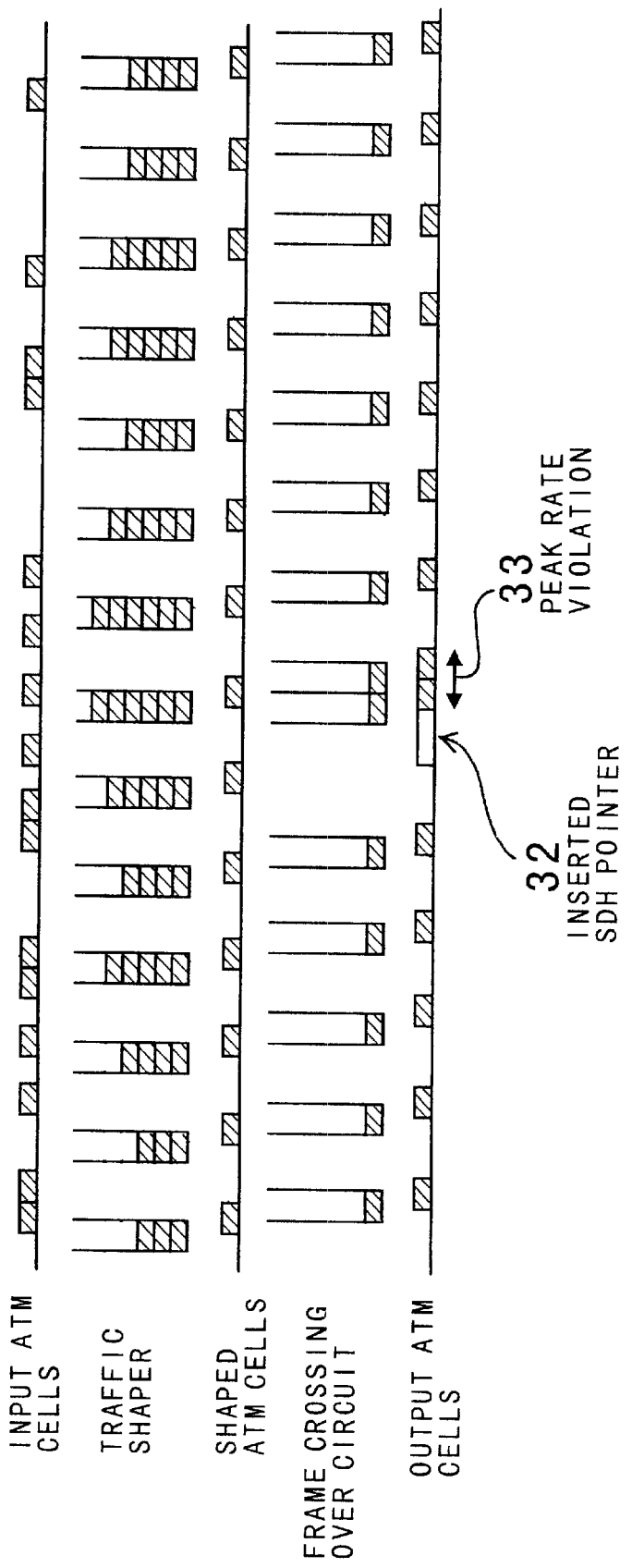

TRAFFIC SHAPING METHOD AND APPARATUS

BACKGROUND OF THE INVENTION

1. Field of the Invention

The present invention relates to an ATM (Asynchronous Transfer Mode) network apparatus, and more particularly to a traffic shaping method and apparatus which controls the output rate when ATM cells are outputted to the outside of an ATM network apparatus.

2. Description of the Related Art

Conventionally, a traffic shaping apparatus of the type mentioned serves as an internal function of an ATM network apparatus and is generally constructed such that it outputs ATM cells whose output rate is controlled by a traffic shaper, before they come to an output of the ATM network apparatus, through a frame crossing-over circuit for crossing over the ATM cells to external operation frames.

In the conventional traffic shaping apparatus described above, a flow of traffic shaped ATM cells suffers from a fluctuation when it passes through the frame crossing-over circuit. This fluctuation sometimes generates a factor which gives rise to a violation to a peak rate.

FIG. 3 is a sequence chart of a signal illustrating an outline of operation from a conventional traffic shaping apparatus as described above. In ordinary operation, ATM cells are outputted regularly at a rate set in advance for the traffic shaper, However, if an overhead pointer 32 of a synchronous digital hierarchy (SDH) is inserted in the ATM cells, then outputting of an ATM cell is temporarily delayed by the inserted overheat pointer 32. Consequently, the interval between the ATM cell and the next ATM cell is reduced, producing a peak rate violate 33. When the peak rate violation 33 occurs, the outer party side of a UNI (User Network Interface) interprets it as a UPC (Usage Parameter Control) violation, and the cell is abandoned. Consequently, the conventional traffic shaping apparatus has the disadvantage in that regular communication is disturbed by occurrence of a peak rate violation caused by a fluctuation of the distance between ATM cells.

SUMMARY OF THE INVENTION

It is an object of the present invention to provide a traffic shaping method and apparatus which prevents such a fluctuation of the interval between ATM cells to be outputted causing a peak rate violation which disturbs regular communication.

In order to attain the object described above, the present invention provides a traffic shaping method; comprising a traffic shaping step of performing a traffic shaping operation while controlling a rate of ATM cells to be outputted from an ATM network apparatus, a crossing over step of crossing over a frame period of the ATM cells, whose output rate has been controlled by the traffic shaping step, from that of internal-operation frames to that of external operation frames, and a supervising step of supervising a transmission rate of the ATM cells outputted in the crossed over frame period.

Since the transmission rate of the ATM cells outputted in the crossed over frame period from the ATM network apparatus is supervised, the traffic shaping can be stopped based on a condition of the output rate, or when the average rate drops, the traffic shaping can be rendered effective until the average rate rises to a maximum rate in advance.

In particular, the supervising step may include a step of supervising the output rate of the ATM cells, and if an overhead including a pointer inserted in the ATM cells is detected, transmitting a back pressure which serves as a stopping signal to stop the traffic shaping operation.

Alternatively or additionally, the supervising step may include a step of supervising the output rate of the ATM cells and transmitting output rate information, and causing, when the average rate exhibits a drop, the traffic shaping operation to be performed until the average rate rises to a maximum rate set in advance.

According to another aspect of the present invention, there is provided a traffic shaping apparatus, comprising a traffic shaper for controlling a rate of ATM cells to be outputted from an ATM network apparatus, a frame crossing over circuit for crossing over a frame period of the ATM cells, whose output rate has been controlled by the traffic shaper, from that of internal operation frames to that of external operation frames, and an output rate supervision circuit for supervising a transmission rate of the ATM cells outputted in the frame period crossed over by the frame crossing over circuit.

The output rate supervision circuit may supervise the output rate of the ATM cells and, if an overhead including a pointer inserted in the ATM cells is detected, transmit a back pressure which serves as a stopping signal to the traffic shaper to stop the traffic shaping operation.

Alternatively or additionally, the output rate supervision circuit may supervise the output rate of the ATM cells and transmit output rate information to the traffic shaper, and cause, when the average rate exhibits a drop, the traffic shaping operation to be performed until the average rate rises to a maximum rate set in advance.

In the traffic shaping method and apparatus, since the transmission rate of ATM cells outputted in a crossed over frame period is supervised, if an overhead including a pointer inserted in the ATM cells is detected, then a back pressure can be transmitted to stop the traffic shaping operation. Consequently, useless retention of the cells can be prevented. Further, since output rate information can be transmitted so that, when an average rate of the ATM cells exhibits a drop, the traffic shaping operation can be stopped until the average rate rises to a maximum rate set in advance. The traffic shaping method and apparatus is advantageous also in that it can prevent such a situation that a flow of the ATM cells exhibits a fluctuation causing an apparatus which receives the flow of the ATM cells to suffer from a UPC violation and abandon a cell, resulting in obstruction to regular communication.

The above and other objects, features and advantages of the present invention will become apparent from the following description and the appended claims, taken in conjunction with the accompanying drawings in which like parts or elements are denoted by like reference symbols.

DESCRIPTION OF THE DRAWINGS

FIG. 2 is a sequence chart of a signal illustrating operation of the traffic shaping apparatus of FIG. 1; and FIG. 3 is a sequence chart of a signal illustrating a conventional traffic shaping apparatus.

DESCRIPTION OF THE PREFERRED EMBODIMENT

Figure 1:
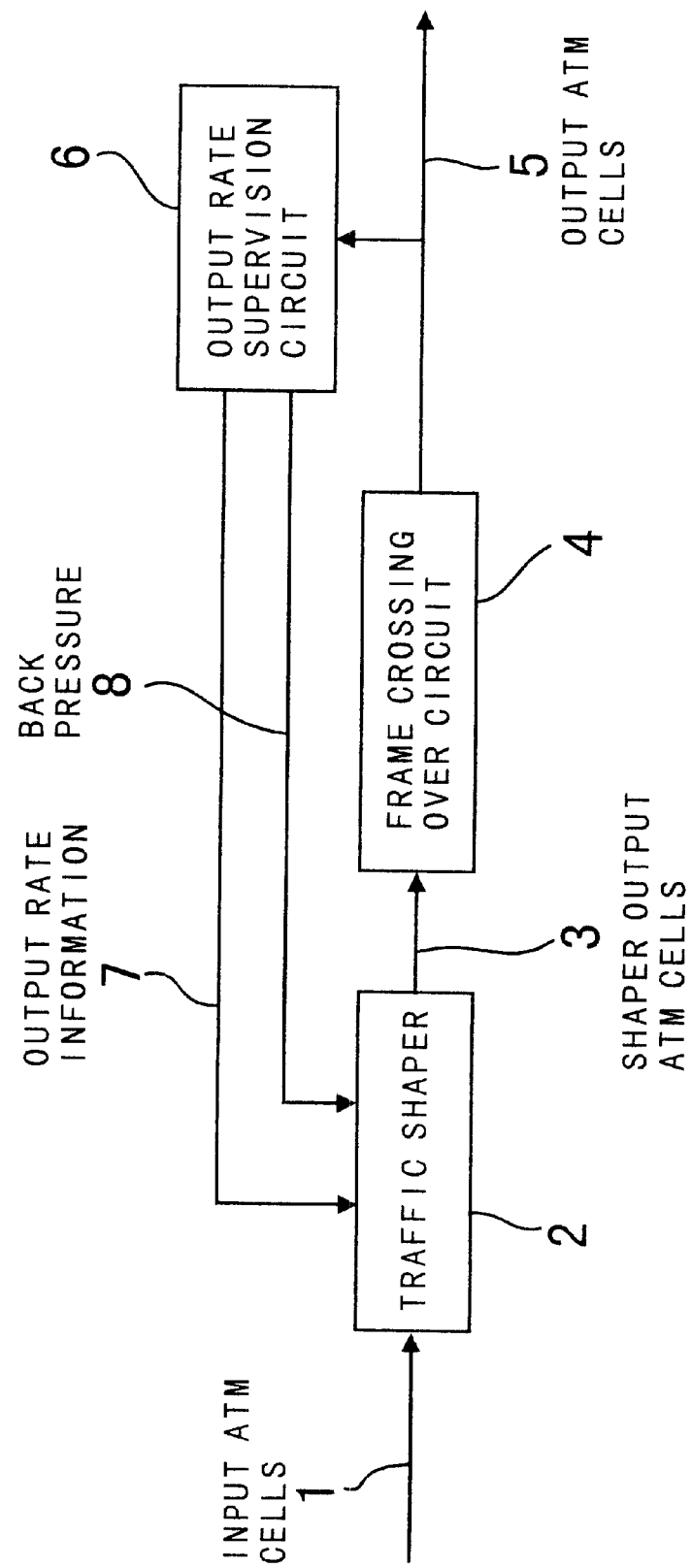
FIG. 1 is a block diagram of a traffic shaping apparatus to which the present invention is applied.

FIG. 1 shows a traffic shaping apparatus to which the present invention is applied, and FIG. 2 illustrates operation of the traffic shaping apparatus of FIG. 1. Referring to FIGS. 1 and 2, the traffic shaping apparatus shown includes a traffic shaper 2, a frame crossing over circuit 4, and an output rate supervision circuit 6. The traffic shaper 2 includes a shaping buffer, and receives input ATM cells 1 as an input thereto, stores the input ATM cells 1 once into the shaping buffer, performs shaping of the input ATM cells 1 at a rate set in advance and outputs the shaped input ATM cells 1 as shaper output ATM cells 3. The frame crossing over circuit 4 receives the shaper output ATM cells 3 as an input thereto, performs crossing over of a frame period from that of internal-operation frames into that of external-operation frames, and outputs resulting cells as output ATM cells 5. The output rate supervision circuit 6 supervises the rate at which the output ATM cells 5 are outputted, and outputs output rate information 7. If the output rate supervision circuit 6 detects an overhead such as an SDH pointer 9 (refer to FIG. 2) inserted in the output ATM cells 5, then it transmits a back pressure 8 to the traffic shaper 2. Upon reception of the back pressure 8, the traffic shaper 2 temporarily stops its traffic shaping operation to prevent useless retention of cells in the frame crossing over circuit 4. Further, in this instance, as the rate drops due to the stopping of the shaping operation, the drop of the rate is reported as the output rate information 7 to the traffic shaper 2. Consequently, the traffic shaper 2 resumes its shaping operation and raises its output rate until the average output rate becomes equal to an allowable maximum rate. The output rate supervision circuit 6 detects the rise of the output rate and reports it to the traffic shaper 2 with the output rate information 7. After the average rate becomes equal to the preset rate, the traffic shaper 2 cancels the raising of the rate and returns to outputting at the ordinary rate.

In the traffic shaping apparatus of the present embodiment, the output rate supervision circuit supervises the output rate of ATM cells and outputs, if an overhead is inserted in the ATM cells, a back pressure to stop the traffic shaping operation. However, if the average rate becomes low, the output rate information is used to render traffic shaping operative until the average rate rises to the preset maximum rate. Consequently, useless retention of cells is prevented, and this prevents fluctuation of a flow of ATM cells and hence prevents occurrence of a UPC violation.

While preferred embodiments of the present invention have been described using specific terms, such description is for illustrative purposes only, and it is to be understood that changes and variations may be made without departing from the spirit or scope of the following claims.

What is claimed is:

1. A traffic shaping method in an ATM network, comprising:
    a traffic shaping and controlling step of performing a traffic shaping operation on input ATM cells, and controlling a rate of ATM cells to be outputted from an ATM network apparatus;
    a converting step of converting an ATM cell's frame period, whose output rate has been controlled by the traffic shaping step, from internal operation-frames to external-operation frames; and
    a supervising step of supervising a transmission rate of the ATM cells outputted in the converting step;
    wherein the supervising step includes a step of supervising the output rate of the ATM cells, and when the average rate exhibits a drop, transmitting output rate information for use in the traffic shaping and controlling operation for causing the traffic shaping and controlling operation to be performed until the average rate rises to a maximum rate set in advance.

2. A traffic shaping apparatus in an ATM network, comprising:
    a traffic shaper/controller for performing a traffic shaping operation on input ATM cells, and for controlling a rate of ATM cells to be outputted from an ATM network apparatus;
    converting circuit for converting an ATM cell's frame period whose output rate has been controlled by said traffic shaper's, from internal operation frames to that of external operation frames; and
    an output rate supervision circuit for supervising a transmission rate of the ATM cells outputted in the frame period converted by said frame converting circuit;
    wherein said output rate supervision circuit supervises the output rate of the ATM cells, and when the average rate exhibits a drop, transmits output rate information to said traffic shaper/controller, causing the traffic shaping/controlling operation to be performed until the average rate rises to a maximum rate set in advance.

3. A traffic shaping method in an ATM network, comprising:
    a traffic shaping step of performing a traffic shaping operation on input ATM cells, while controlling a rate of ATM cells to be outputted from an ATM network apparatus;
    a converting step of converting an ATM cell's frame period, whose output rate has been controlled by the traffic shaping step, from internal operation-frames to external-operation frames; and
    a supervising step of supervising a transmission rate of the ATM cells outputted in the converting step,
    wherein the supervising step includes a step of supervising the output rate of the ATM cells and, transmitting, if an overhead including a pointer inserted in the ATM cells is detected, a stopping signal to at least temporarily stop the traffic shaping operation.

4. A traffic shaping method as claimed in claim 3, wherein the supervising step includes a step of supervising the output rate of the ATM cells, and when the average rate exhibits a drop, transmitting output rate information for use in the traffic shaping operation for causing the traffic shaping operation to be performed until the average rate rises to a maximum rate set in advance.

5. A traffic shaping apparatus in an ATM network, comprising:
    a traffic shaper for performing a traffic shaping operation on input ATM cells, while controlling a rate of ATM cells to be outputted from an ATM network apparatus;
    a frame crossing over circuit for converting an ts ATM cell frame period, whose output rate has been controlled by said traffic shaper's, from internal operation frames to that of external operation frames; and
    an output rate supervision circuit for supervising a transmission rate of the ATM cells outputted in the frame period crossed over by said frame crossing over circuit,
    wherein said output rate supervision circuit supervises the output rate of the ATM cells and transmits, if an overhead including a pointer inserted in the ATM cells is detected, a stopping signal to said traffic shaper to at least temporarily stop the traffic shaping operation.

6. A traffic shaping apparatus as claimed in claim 5, wherein said output rate supervision circuit supervises the output rate of the ATM cells, and when the average rate exhibits a drop, transmits output rate information to said traffic shaper, causing the traffic shaping operation to be performed until the average rate rises to a maximum rate set in advance.

* * * * *